US012779555B2

(12) United States Patent
Haremaki et al.

(10) Patent No.: US 12,779,555 B2
(45) Date of Patent: Nov. 3, 2026

(54) LATERAL PROCESSING MACHINE AND LATERAL PROCESSING SYSTEM

(71) Applicant: SUGINO MACHINE LIMITED, Namerikawa City (JP)

(72) Inventors: Hiroki Haremaki, Namerikawa City (JP); Hideyoshi Otani, Namerikawa City (JP); Ryo Egawa, Namerikawa City (JP)

(73) Assignee: SUGINO MACHINE LIMITED, Namerikawa City (JP)

( * ) Notice: Subject to any disclaimer, the term of this patent is extended or adjusted under 35 U.S.C. 154(b) by 400 days.

(21) Appl. No.: 18/507,277

(22) Filed: Nov. 13, 2023

(65) Prior Publication Data

US 2024/0165716 A1 May 23, 2024

(30) Foreign Application Priority Data

Nov. 21, 2022 (JP) ................................ 2022-185557

(51) Int. Cl.
*B23B 39/10* (2006.01)
*B23Q 1/01* (2006.01)
(Continued)

(52) U.S. Cl.
CPC .............. *B23B 39/10* (2013.01); *B23Q 1/015* (2013.01); *B23Q 1/25* (2013.01); *B23Q 1/626* (2013.01);
(Continued)

(58) Field of Classification Search
CPC ......... B23B 39/10; B23B 39/04; B23Q 1/626; B23Q 39/022; B23Q 1/015; B23Q 1/01; B23Q 1/25; B23Q 5/28; B23Q 5/385
See application file for complete search history.

(56) References Cited

U.S. PATENT DOCUMENTS 5,183,374 A * 2/1993 Line ....................... B23Q 1/015 409/235
5,564,483 A * 10/1996 Sacchi ..................... B23Q 1/03 144/286.5
(Continued)

FOREIGN PATENT DOCUMENTS

CN 202174414 U 3/2012
CN 107866589 A 4/2018
(Continued)

OTHER PUBLICATIONS

Translation of DE-3704952-A1 (Year: 1987).*
(Continued)

*Primary Examiner* — Jacob J Cigna
(74) *Attorney, Agent, or Firm* — United IP Counselors, LLC

(57) ABSTRACT

A lateral processing machine includes an upper beam and a lower beam extending in an X direction; upper and lower X guides extending in the X direction; a first moving column including a first connection block on the upper X guide to move in the X direction, a second connection block on the lower X guide to move in the X direction, and a first column portion connecting the first connection block and the second connection block; a pair of first Y guides extending in the Y direction; a first Y table movable in the Y direction; and a first processing unit detachably attached to the first Y table and including a first ram movable in a Z direction and a first spindle supported by the first ram.

18 Claims, 9 Drawing Sheets

(51) Int. Cl.

| | |
|---|---|
| ***B23Q 1/25*** | (2006.01) |
| ***B23Q 1/62*** | (2006.01) |
| ***B23Q 5/28*** | (2006.01) |
| ***B23Q 39/02*** | (2006.01) |

(52) U.S. Cl.

CPC .............. *B23Q 39/022* (2013.01); *B23Q 1/01* (2013.01); *B23Q 5/28* (2013.01)

(56) References Cited

U.S. PATENT DOCUMENTS

| | | | | |
|---|---|---|---|---|
| 6,623,222 | B1 | 9/2003 | Kroll et al. | |
| 2018/0085879 | A1* | 3/2018 | Neubert | B23Q 1/626 |

FOREIGN PATENT DOCUMENTS

| | | | | | |
|---|---|---|---|---|---|
| CN | 207747162 | U | | 8/2018 | |
| CN | 111069924 | A | * | 4/2020 | B23Q 11/0032 |
| CN | 113245866 | A | | 8/2021 | |
| DE | 3704952 | A1 | * | 8/1988 | B25J 9/023 |
| EP | 0816012 | A1 | * | 1/1998 | B23Q 1/01 |
| EP | 2965862 | B1 | * | 6/2019 | B23Q 11/08 |
| EP | 3498420 | A1 | | 6/2019 | |
| JP | S51-162397 | U | | 12/1976 | |
| JP | H06-190667 | A | | 7/1994 | |
| JP | 2002079431 | A | * | 3/2002 | |
| KR | 10-2013-0037464 | A | | 4/2013 | |

OTHER PUBLICATIONS

Translation of EP-2965862-B1 (Year: 2014).*

JP-2002079431-A (Year: 2000).*

Extended European Search Report mailed on Mar. 26, 2024 in a corresponding European Patent Application No. 23204978.3 (8 pages).

Japanese Office Action mailed on Aug. 12, 2025 in a corresponding Japanese Patent Application No. 2022-185557 (4 pages).

Chinese Office Action mailed on Mar. 26, 2026, in corresponding Chinese Patent Application No. 202311527490.6 (9 pages).

* cited by examiner

LATERAL PROCESSING MACHINE AND LATERAL PROCESSING SYSTEM

CROSS-REFERENCE TO RELATED APPLICATIONS

This application claims the benefit of priority to Japanese Patent Application No. 2022-185557, filed on Nov. 21, 2022, the entire contents of which are hereby incorporated by reference.

BACKGROUND

1. Technical Field

The present invention relates to a lateral processing machine and a lateral processing system.

2. Description of the Background

A conventional horizontal drilling machine includes a box-shaped frame having a left wall, a right wall, an upper wall, a lower wall, and a rear wall; a slideway having both ends fixed to the left and right walls with fixed to the upper wall; a slideway having both ends fixed to the left and right walls with fixed to the lower wall; and a column having both ends fixed to the upper and lower slideways (Japanese Utility Model Application Publication S51-162397 A; hereinafter, Patent Literature 1).

BRIEF SUMMARY

In the horizontal drilling machine of Patent Literature 1, it is difficult to increase the parallelism between the X axis (left-right axis), the Y axis (vertical axis), and the Z axis (front-rear axis) and the workpiece.

An object of the present invention is to provide a lightweight lateral processing machine which is easy to increase the parallelism between the X axis, the Y axis, and the Z axis and the workpiece.

A first aspect of the present invention provides a lateral processing machine, including:

- an upper beam and a lower beam extending in an X direction;
- an upper X guide disposed on a rear surface of the upper beam, the upper X guide extending in the X direction;
- a lower X guide disposed on a rear surface of the lower beam, the lower X guide extending in the X direction;
- a first moving column extending in a Y direction orthogonal to the X direction, the first moving column including,
  - a first connection block disposed on the upper X guide, the first connection block configured to move in the X direction,
  - a second connection block disposed on the lower X guide, the second connection block configured to move in the X direction, and
  - a first column portion connecting the first connection block and the second connection block;
- a pair of first Y guides disposed on the first moving column, each of the first Y guide extending in the Y direction;
- a first Y table disposed on the pair of the first Y guides, the first Y table configured to move in the Y direction; and
- a first processing unit detachably attached to the first Y table, the first processing unit including,

- a first ram configured to move in a Z direction orthogonal to both the X direction and the Y direction, and
  - a first spindle supported by the first ram.

The lateral processing machine may include,

- a third X motor including a third X output shaft, the third X motor disposed on the third connection block;
- a third X helical gear fastened to the third output shaft to mesh with the upper X helical rack;
- a fourth X motor including a fourth output shaft, the fourth X motor disposed on the fourth connection block; and
- a fourth X helical gear fastened to the fourth output shaft to mesh with the lower X helical rack.

The control device may synchronize a rotation of the third X output shaft with a rotation of fourth X output shaft.

The lateral processing machine may include,

- a second Y helical rack disposed on the second moving column, the second Y helical rack extending in the Y direction;
- a second Y motor including a second Y output shaft, the second Y motor disposed on the second Y table; and
- a second Y helical gear fastened to the second Y output shaft to mesh with the second Y helical rack.

The lateral processing machine may include,

- a fourth Y motor including a fourth Y output shaft, the fourth Y motor disposed on the fourth Y table; and
- a fourth Y helical gear fastened to the fourth Y output shaft to mesh with the second Y helical rack.

The third Y table may be disposed on a first side of the first moving column. The third processing unit may be disposed on the first side of the first moving column. The fourth Y table may be disposed on a second side of the second moving column. The fourth processing unit may be disposed on the second side of the second moving column.

The first column portion may include a first main column, a first sub-column disposed on a second side of the first main column, and a first side-column connected to the first main column and disposed on a lateral side of the first main column in the Z direction. The first connection block connects the upper ends of the first main column and the first sub-column. The second connection block connects the lower ends of the first main column and the first sub-column. The pair of first Y guides are disposed on the main column and the side-column, respectively. The first Y helical rack is disposed on the first main column or the first side-column.

The first column portion is disposed below the upper beam and the first connection block. The width of the first column portion in the Z direction is substantially the same as the width of the upper beam and the first connection block in the Z direction.

The first column portion is disposed above the lower beam and the second connection block. The width of the first column portion in the Z direction is substantially the same as the width of the lower beam and the second connecting block in the Z direction.

The upper X guide and the upper X helical rack may be disposed on the rear surface of the upper beam when viewed from the distal end of the spindle. The first main column, the first sub-column, the first connection block, and the second connection block may be disposed on the rear surface of the upper beam when viewed from the distal end of the spindle. The lower X guide and the lower X helical rack may be disposed on the rear surface of the lower beam when viewed from the distal end of the spindle. The first main column, the first sub-column, the first connection block, and the second connection block may be disposed on the rear surface of the lower beam when viewed from the distal end of the spindle. The first side-column may be disposed below the upper beam.

The second column portion may include a second main column, a second sub-column disposed on a first side of the second main column, and a second side-column connected to the second main column and disposed on a lateral side of the second main column in the Z direction. The third connection block connects the upper ends of the second main column and the second sub-column. The fourth connection block connects the lower ends of the second main column and the second sub-column. The pair of the second Y guides are disposed on the second main column and the second side-column, respectively. The second Y helical rack is disposed on the second main column or the second side-column.

The second column portion is disposed below the upper beam and the third connection block. The width of the second column portion in the Z direction is substantially the same as the width of the upper beam and the third connection block in the Z direction.

The second column portion is disposed above the lower beam and the fourth connection block. The width of the second column portion in the Z direction is substantially the same as the width of the lower beam and the fourth connection block in the Z direction.

The lower X guide and the lower X helical rack may be disposed on the rear surface of the lower beam when viewed from the distal end of the spindle. The second main column, the second sub-column, the third connection block, and the fourth connection block may be disposed on the rear surface of the upper beam when viewed from the distal end of the spindle. The second main column, the second sub-column, the second connection block, the third connection block, and the fourth connection block may be disposed on the rear surface of the lower beam when viewed from the distal end of the spindle. The second side-column may be disposed below the upper beam.

The expansion cover is, for example, a bellows, a telescopic cover, or a roll up cover.

Hereinafter, the moving column and the Y guide, the Y table, the Y helical rack, the Y motor, the processing unit disposed on the moving column are referred to as a processing machine group. The processing machine group moves integrally in the X direction. One or more processing machine groups may be disposed. Three or more processing machine groups may be arranged.

The height of the opening may be substantially the same as the height of the first column or the second column. The height of the opening may be substantially the same as the height of the first Y guide or the second Y guide. The width of the opening may be substantially the same as the width of the first processing unit, the second processing unit, the third processing unit, the fourth processing unit, the first Y table, the second Y table, the third Y table, or the fourth Y table. The width of the opening may be substantially the same as the width of the first column or the second column. Here, substantially the same means that the members listed above are able to pass through when they are detached.

When the first moving column is moved so as to be exposed to the opening, the first processing unit or the first Y table may be exposed from the opening. At this time, the third processing unit and the third Y table may be exposed from the opening.

When the second moving column is moved so as to be exposed to the opening, the second processing unit and the second Y table may be exposed from the opening. At this time, the fourth processing unit and the fourth Y table may be exposed from the opening.

According to the lateral processing machine of the present invention, the parallelism between the X axis, the Y axis, and the Z axis and the workpiece is easily increased with reduced weight.

DETAILED DESCRIPTION

First Embodiment

Figure 1:
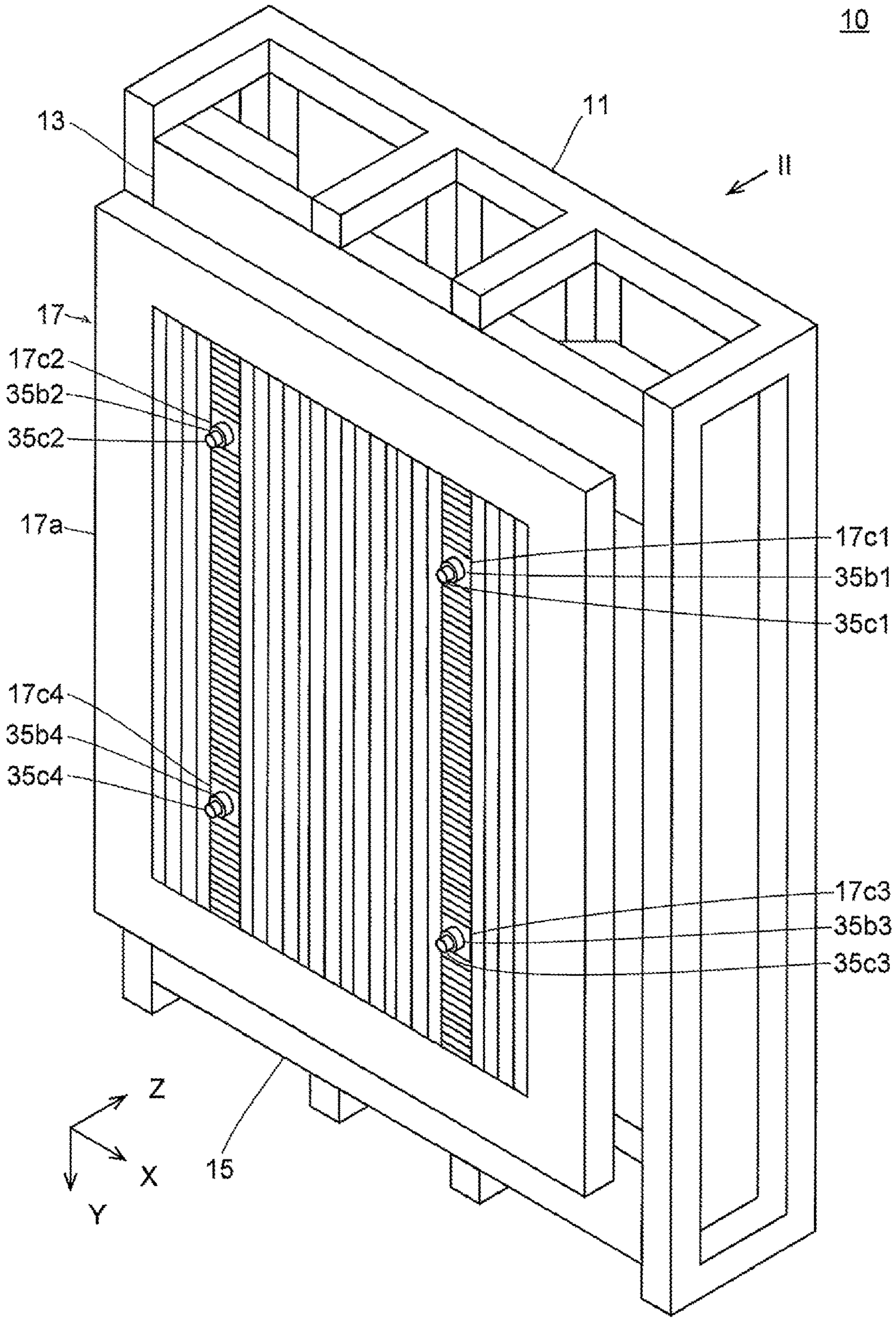
FIG. 1 is a lateral processing machine according to a first embodiment.

As shown in FIGS. 1 to 6, a lateral processing machine 10 according to the present embodiment includes a support frame 11, an upper beam 13, a lower beam 15, an upper X guide 211, a lower X guide 212, an upper X rack (an upper X helical rack) 231, a lower X rack (a lower X helical rack) 232, a first processing machine group 181, a second processing machine group 182, and a expansion cover 17.

Hereinafter, a +X direction in FIG. 1 is defined as right, and a −X direction is defined as left. A −Y direction is defined as up, and a +Y direction is defined as down. A −Z direction is defined as front, and a +Z direction is defined as rear.

The first processing machine group 181 includes a first column (first moving column) 191, a first X motor 241, a first X gear (X helical gear) 221, a second X motor 242, a second X gear (second X helical gear) 222, a first Y guide 271, a first Y table 251, a first Y rack (Y helical rack) 291, a first Y motor 301, a first Y gear (first Y helical gear) 281, a first processing unit 351, a third Y table 253, a third processing unit 353, and a third Y helical gear 283. The first processing unit 351 and the third processing unit 353 are disposed on the left side (first side) of the first column 191.

The second processing machine group 182 is substantially the same as the first processing machine group 181. The second processing machine group 182 is symmetrical to the first processing machine group 181 with respect to YZ plane. The second processing machine group 182 includes a second column (moving column) 192, a third X motor 243, a third X gear (third X helical gear) 223, a fourth X motor 244, a fourth X gear (fourth X helical gear) 224, a second Y guide 272, a second Y table 254, a second Y rack (second helical rack) 292, a second Y motor 302, a second Y gear (second helical gear) 282, a second processing unit 352, a fourth Y table 254, a fourth Y motor 304, a fourth Y helical gear 284, and a fourth processing unit 354. The second processing machine group 182 is disposed on the left side of the first processing machine group 181. The second processing unit 352 and the fourth processing unit 354 are disposed on the right side (second side) of the second column 192.

Figure 4:
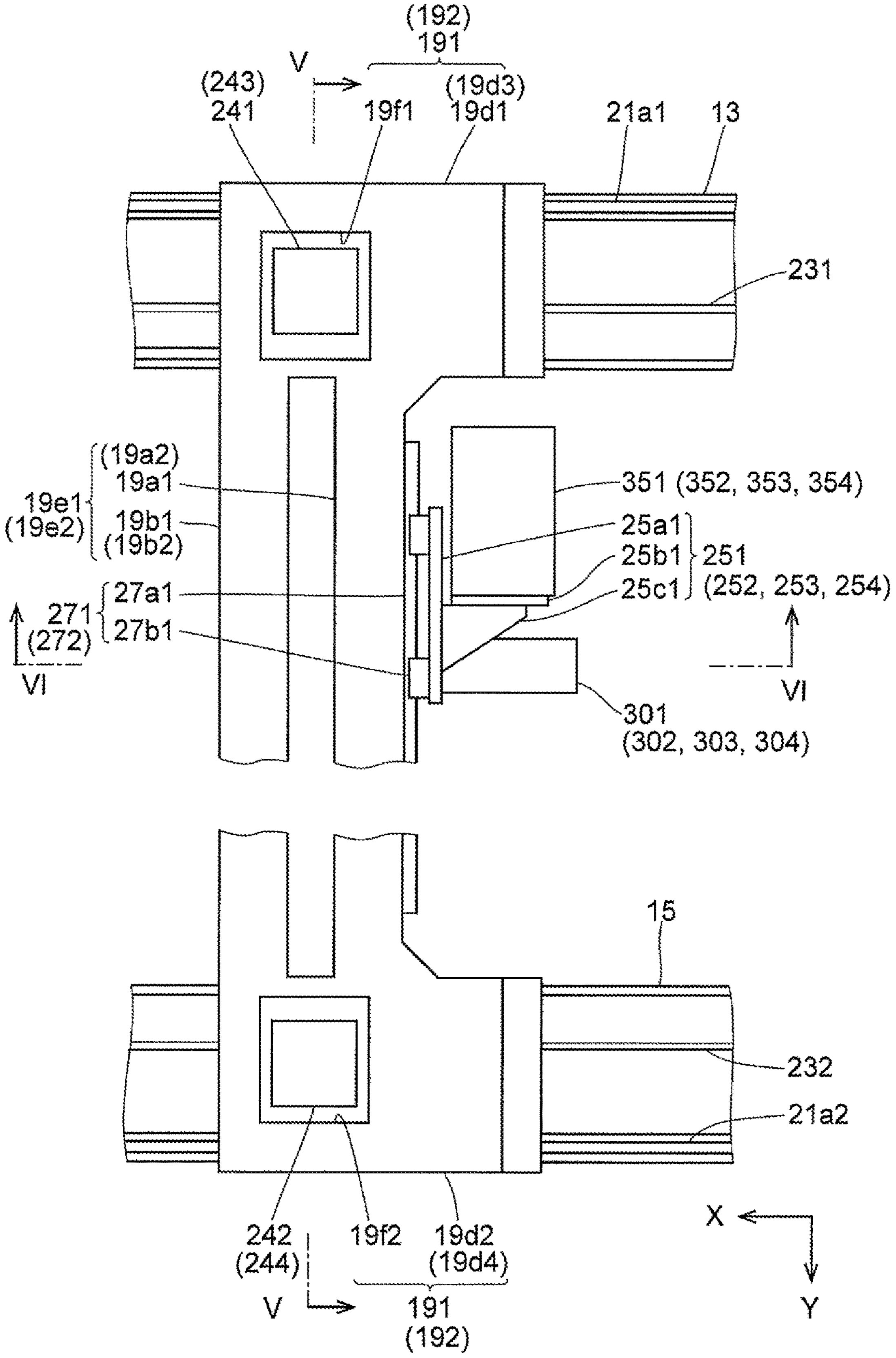
FIG. 4 shows a view of FIG. 3 as viewed along an arrow IV.
Figure 5:
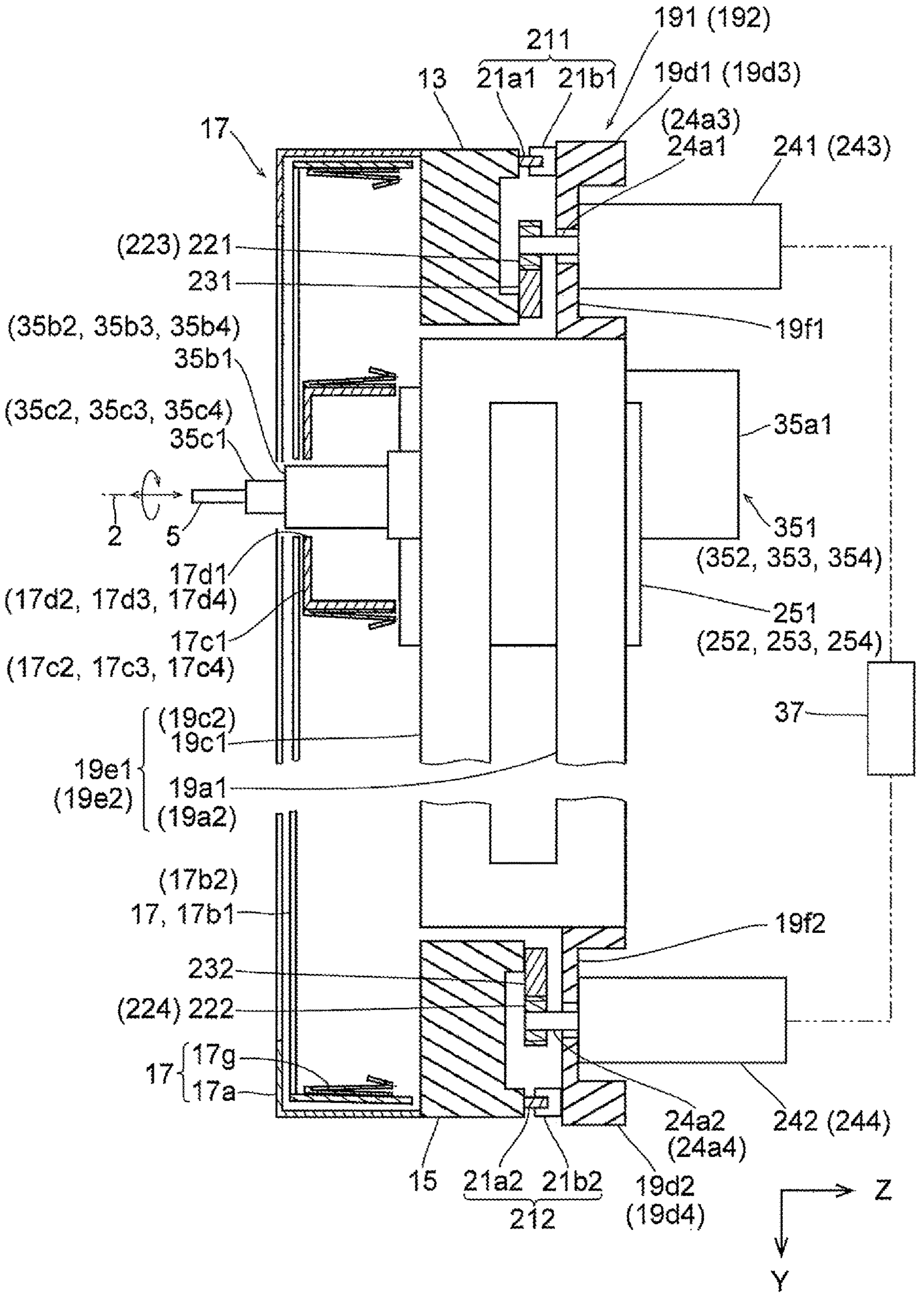
FIG. 5 is a cross-sectional view taken along a V-V line in FIG. 4.
Figure 6:
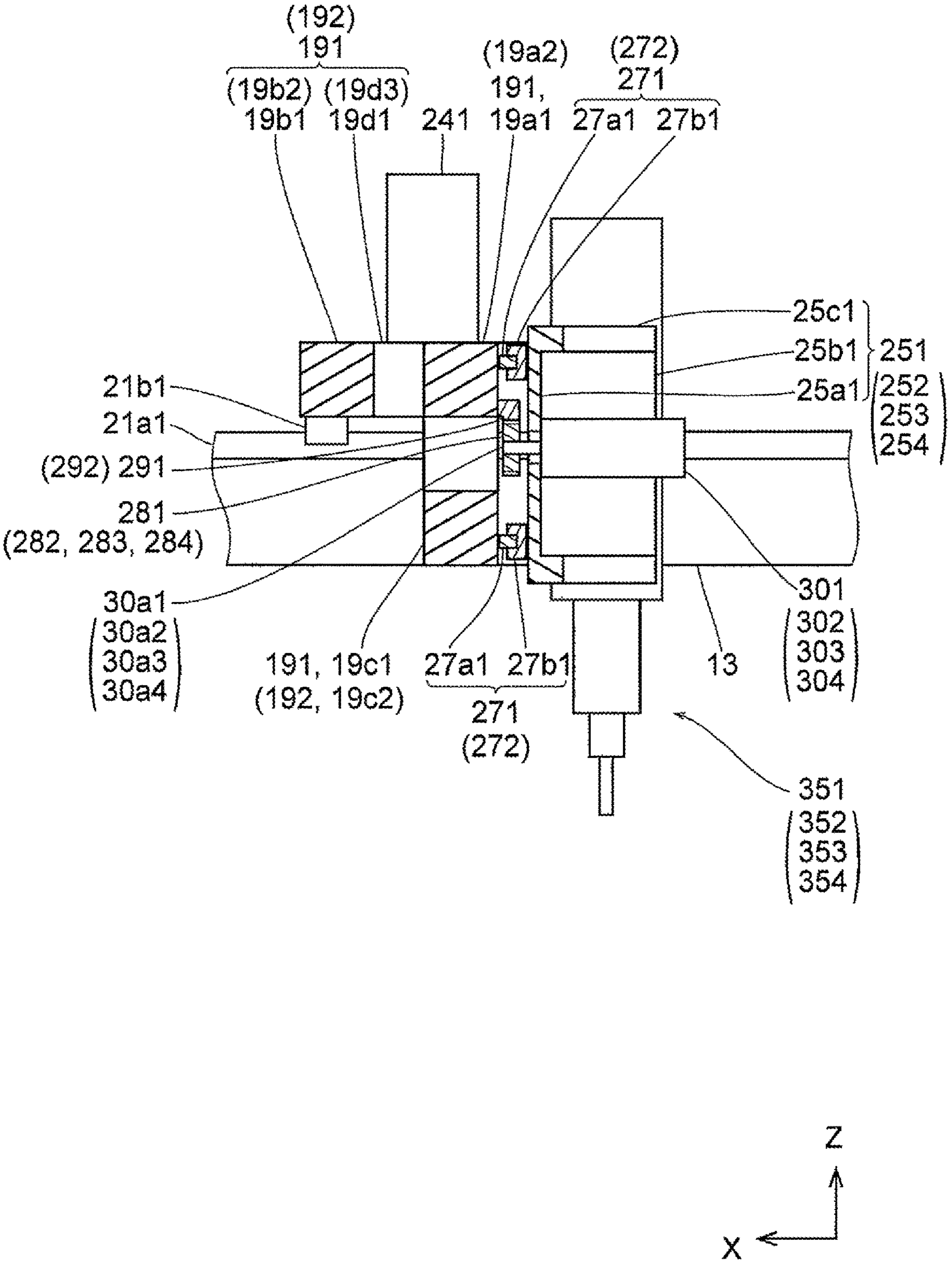
FIG. 6 is a cross-sectional view taken along a VI-VI line in FIG. 4.

In FIG. 4 to FIG. 6, reference numerals of members having the same structure are also shown in parenthesis.

The first processing unit 351, the second processing unit 352, the third processing unit 353, and the fourth processing unit 354 are substantially the same. The first processing unit 351 includes a first case **35*a*1, a first ram 35*b*1, and a first spindle 35*c*1. The second processing unit 352 includes a second case 35*a*2, a second ram 35*b*2, and a second spindle 35*c*2. The third processing unit 353 includes a third case 35*a*3, a third ram 35*b*3, and a third spindle 35*c*3. The fourth processing unit 354 includes a fourth case 35*a*4, a fourth ram 35*b*4, and a fourth spindle 35*c*4**.

Figure 2:
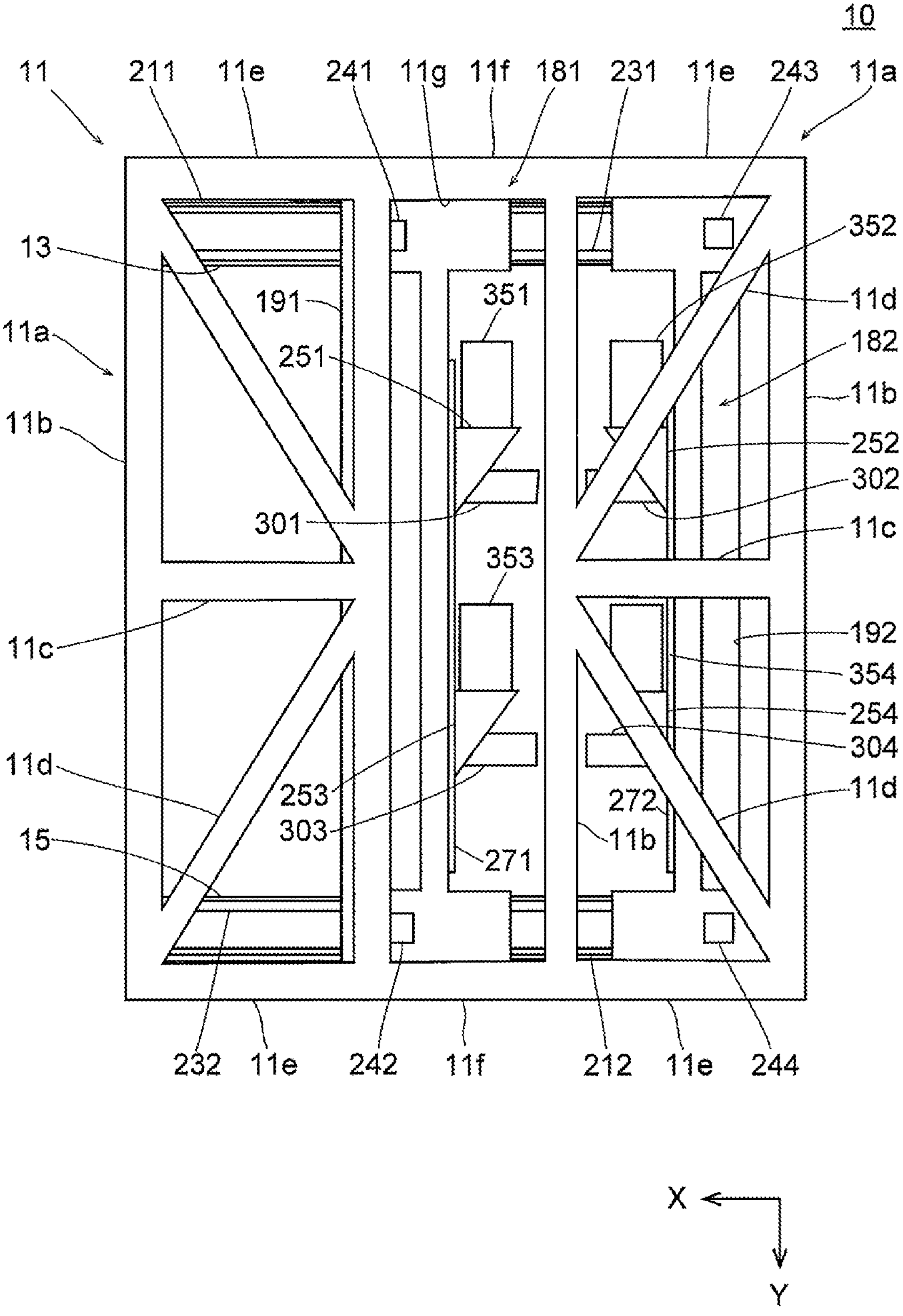
FIG. 2 shows a view of FIG. 1 as viewed along an arrow II.

As shown in FIG. 2, the support frame 11 includes a pair of column groups **11*a*, a connecting beam 11*f*, and an opening 11*g*. The pair of column groups 11*a* are symmetrical with respect to YZ plane. The column groups 11*a* include a pair of columns 11*b*, a horizontal member 11*c*, an end beam 11*e*, and a diagonal member 11*d*. The support frame 11 has a truss structure. When viewed from the rear, the end beam 11*e* connects the upper and lower ends of the pair of column 11*b*. The horizontal member 11*c* extends in the lateral direction between the pair of columns 11*b*. A plurality of horizontal members 11*c* may be arranged. The diagonal member 11*d* connects diagonal connecting portions located at the end beam 11*e*, the horizontal member 11*c*, and the pair of columns 11*b*, respectively. The connecting beams 11*f* respectively connect the upper end and lower end of the pair of column group 11*a*** connected by the truss structure.

The opening **11*g* is partitioned by the pair of column groups 11*a* and the connecting beam 11*f*. The horizontal member 11*c* and the diagonal member 11*d* are not disposed in the opening 11*g*. The opening 11*g* extends vertically. The height of the opening 11*g* is preferably as high as possible. For example, the opening 11*g* has substantially the same height as the first column 191 and the second column 192. The width of the opening 11*g* is substantially equal to the width of the first processing machine group 181 and the second processing machine group 182. Each member constituting the support frame 11** may be integrally formed.

The side surface, the upper surface, and the lower surface of the support frame 11 may have a rigid frame structure. In this case, the side surface, the upper surface, and the lower surface of the support frame 11 are preferably reinforced by ribs or plates so as to be difficult to deform.

The side surface, the upper surface, and the lower surface of the support frame 11 may have a truss structure.

Figure 3:
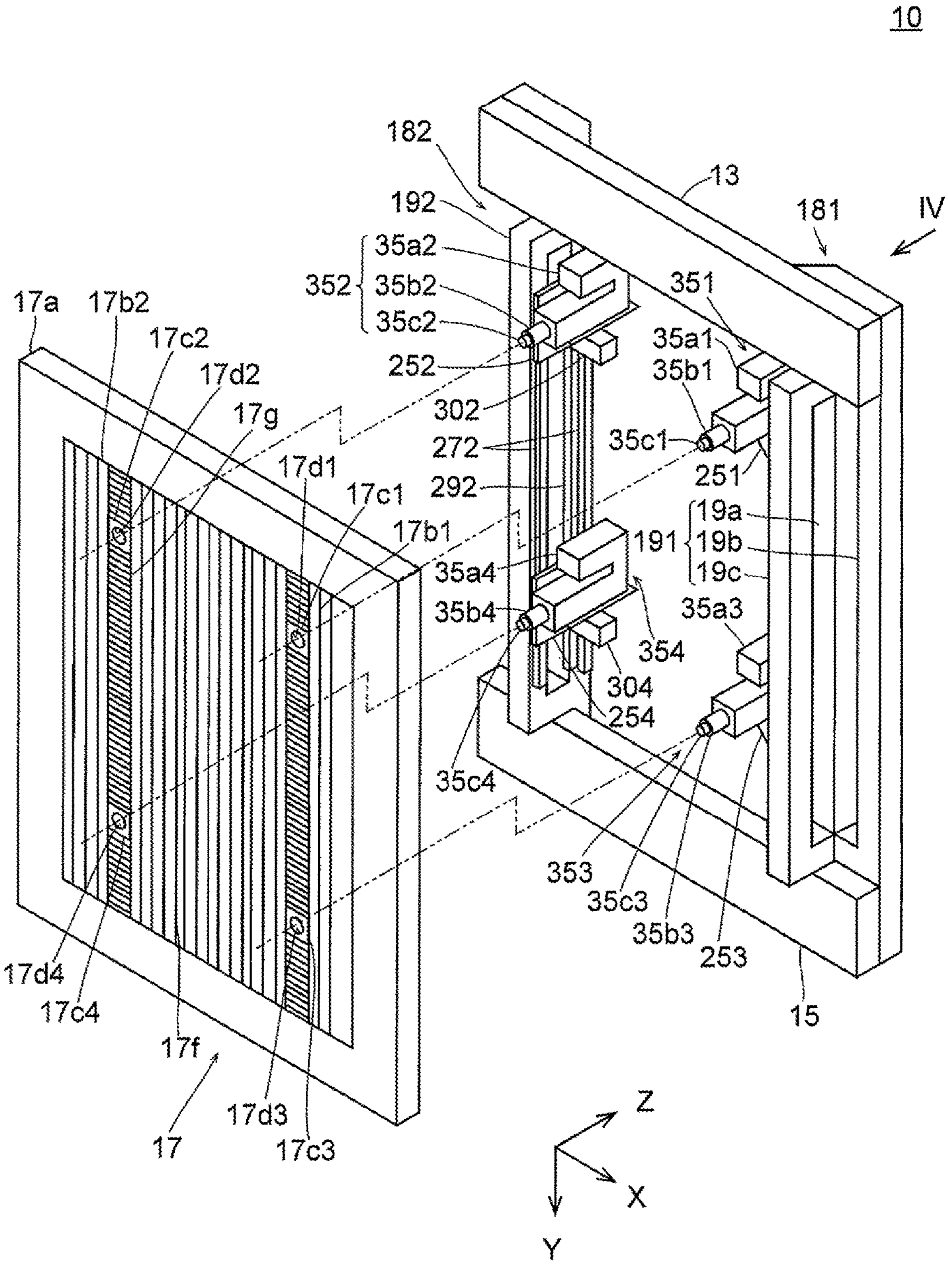
FIG. 3 is an exploded view of the lateral processing machine according to the first embodiment.

As shown in FIGS. 3 and 5, the bellows cover (expansion cover) 17 includes a bellows case (expansion cover case) **17*a*, a first X box 17*b*1, a second X box 17*b*2, a first Y box 17*c*1, a second Y box 17*c*2, a third Y box 17*c*3, a fourth Y box 17*c*4, an X bellows (X expansion cover) 17*f*, and a Y bellows (Y expansion cover) 17*g***.

The bellows case **17*a* has large openings on the front and back surfaces. The bellows case 17*a* is disposed in the support frame 11, the upper beam 13, and the lower beam 15**.

The first X box **17*b*1 and the second X box 17*b*2, which are disposed in the bellows case 17*a*, extend in the Y direction. The first X box 17*b*1 and the second X box 17*b*2** move freely in the X direction.

The first Y box **17*c*1 and the third Y box 17*c*3 move freely in the Y direction in the first X box 17*b*1. The second Y box 17*c*2 and the fourth Y box 17*c*4 move freely in the Y direction in the second X box 17*c*2. The first to fourth Y boxes 17*c*1 to 17*c*4 have first to fourth ram through holes 17*d*1 to 17*d*4, respectively. The first to fourth ram 35*b*1 to 35*b*4 pass through the first to fourth ram through holes 17*d*1 to 17*d*4**, respectively.

The X bellows **17*f* is disposed between the bellows case 17*a*, the first X box 17*b*1, and the second X box 17*b*2. The X bellows 17*f*** expands and contracts in the X direction.

The Y bellows **17*g* is disposed between the first X box 17*b*1, the first Y box 17*c*1, and the third Y box 17*c*3. The Y bellows 17*g* expands and contracts in the Y direction. The Y bellows 17*g* is disposed between the second X box 17*b*2, the second Y box 17*c*2, and the fourth Y box 17*c*4. The Y bellows 17*g*** expands and contracts in the Y direction.

As shown in FIGS. 1 and 3, the upper beam 13 is fixed to an upper end portion of the support frame 11. The upper beam 13 extends in the X direction. The upper beam 13 has a rectangular cross section elongated in the vertical direction.

The lower beam 15 is fixed to a lower end portion of the support frame 11. The lower beam 15 extends in the X direction. The lower beam 15 has a rectangular cross section elongated in the vertical direction. The upper beam 13 and the lower beam 15 are aligned at the same position in the front-rear direction.

As shown in FIGS. 4 and 5, the upper X guide 211 includes an X guide rail **21*a*1 and an X guide block 21*b*1. The X guide rail 21*a*1, which extends in the X direction, is fixed to the rear upper end portion of the upper beam 13. The X guide block 21*b*1 is guided in the X guide rail 21*a*1** to move in the X direction.

The lower X guide 212 includes an X guide rail **21*a*2 and an X guide block 21*b*2. The X guide rail 21*a*2, which extends in the X direction, is fixed to the rear lower end portion of the lower beam 15. The X guide block 21*b*2 is guided in the X guide rail 21*a*2** to move in the X direction.

As shown in FIGS. 4 to 6, the first column 191 includes a first column portion **19*e*1, a first connection block 19*d*1, and a second connection block 19*d*2. The first column portion 19*e*1 includes a first main column 19*a*1, a first sub-column 19*b*1, and a first side-column 19*c*1. The cross section of the first column portion 19*e*1** extends in the front-rear direction (Z direction).

The first main column **19*a*1**, which has a rectangular cross-section, extends in the Y direction.

The first sub-column **19*b*1 is disposed in the +X direction (right side) of the first main column 19*a*1. The first sub-column 19*b*1**, which has a rectangular cross-section, extends in the Y direction.

The second column 192 includes a second column portion **19*e*2, a third connection block 19*d*3, and a fourth connection block 19*d*4. The second column portion 19*e*2 includes a second main column 19*a*2, a second sub-column 19*b*2, and a second side-column 19*c*2**.

The first column 191 and the second column 192 have substantially the same structure.

The first connection block **19*d*1 connects the first main column 19*a*1 and the first sub-column 19*b*1 at the upper end of the first column 191. The first connection block 19*d*1, which has a rectangular cross-section, extends in the X direction. The first connection block 19*d*1 protrudes leftward from the first main column 19*a*1. The first connection block 19*d*1 has a first recess 19*f*1. The first recessed 19*f*1 is disposed at a rear central portion of the first connection block 19*d*1. The first connection block 19*d*1 is fastened to the X guide block 21*b*1**.

The second connection block **19*d*2 connects the first main column 19*a*1 and the first sub-column 19*b*1 at the lower end of the first column 191. The second connection block 19*d*2 has a second recess 19*f*2. The second connection block 19*d*2 is symmetrical to the first connection block 19*d*1 with respect to the ZX plane. The second connection block 19*d*2 is fastened to the X guide block 21*b*2**.

As shown in FIG. 5, the first side-column **19*c*1 is disposed on the front side (−Z side) of the first main column 19*a*1. The upper and lower ends of the first side-column 19*c*1 are connected to the first main column 19*a*1. The first side-column 19*c*1 may be connected to the first main column 19*a*1 at a central portion in the height direction. A plate or a rib may be attached between the first side-column 19*c*1 and the first main column 19*a*1**.

As shown in FIG. 6, the first column 191 is L-shaped when viewed from the Y direction. The first main column **19*a*1, the first sub-column 19*b*1, the first connection block 19*d*1, and the second connection block 19*d*2 are located behind the upper beam 13 and the lower beam 15. The first side column 19*c*1 is located below the upper beam 13 and above the lower beam 15. In other words, the first side column 19*c*1 protrudes forward from the first main column 19*a*1 so that the front surface of the first side-column 19*c*1 is substantially aligned with the front surface of the upper beam 13 and the lower beam 15**.

As shown in FIGS. 4 and 5, the upper X rack 231 is disposed at the rear lower end of the upper beam 13. The upper X rack 231 extends in the X direction. The upper X rack 231 has tooth surfaces facing upward. The first X motor 241 includes a first X output shaft **24*a*1. The first X motor 241 is disposed in the first recess 19*f*1. The first X output shaft 24*a*1 protrudes to the front surface of the first connection block 19*d*1. The first X gear 221 is fastened to the first X output shaft 24*a*1 to mesh with the upper X rack 231**.

The lower X rack 232 is disposed at the rear upper end of the lower beam 15. The lower X rack 232 extends in the X direction. The lower X rack 232 has tooth surfaces facing downward. The second X motor 242 includes a second X output shaft **24*a*2. The second X motor 242 is disposed in the second recess 19*f*2. The second X output shaft 24*a*2 protrudes to the front surface of the second connection block 19*d*2. The second X gear 222 is fastened to the second X output shaft 24*a*2 to mesh with the lower X rack 232**.

The third X motor 243 includes a third X output shaft **24*a*3. The fourth X motor 244 includes a fourth X output shaft 24*a*4**.

The second Y motor 302 includes a second Y output shaft **30*a*2. The third Y motor 303 includes a third Y output shaft 30*a*3. The fourth Y motor 304 includes a fourth Y output shaft 30*a*4**.

The combination of the upper X rack 231, the first X gear 221, the first X motor 241, the lower X rack 232, the second X gear 222, and the second X motor 242 may be changed to a ball screw and servo motor mechanism or a linear motor. When a ball screw and servo motor mechanism is used, the ball screw may be a nut rotation type ball screw.

The upper X rack 231 may be a tapered rack. Here, the first X gear 221 and the second X gear 222 are tapered gears.

As shown in FIG. 6, each of the pair of first Y guides 271 includes a Y guide rail **27*a*1 and a Y guide block 27*b*1. The Y guide rail 27*a*1 is disposed on the left side surface of the first main column 19*a*1 and the left side of the first side-column 19*c*1, respectively. The pair of Y-guide rails 27*a*1 extends in the Y direction. The Y guide block 27*b*1 is guided in the Y guide rail 27*a*1** to move in the Y direction.

The first Y table 251 includes a base plate **25*a*1, a table plate 25*b*1, and a rib 25*c*1. The base plate 25*a*1, which extends in YZ plane, is fastened to the Y guide block 27*b*1. When viewed from the front, the table plate 25*b*1 extends horizontally leftward from the base plate 25*a*1. The rib 25*c*1 supports the table plate 25*b*1** from below.

The first Y rack 291 is disposed on the left side surface of the first main column **19*a*1. The first Y rack 291 extends in the Y direction. The first Y rack 291 has tooth surfaces facing forward and disposed between the first main column 19*a*1 and the first side-column 19*c*1**.

The first Y motor 301 includes a first Y output shaft **30*a*1. The first Y motor 301 is disposed on the left side surface of the base plate 25*a*1. The first Y output shaft 30*a*1 protrudes rightward of the base plate 25*a*1. The first Y gear 281 is fastened to the first Y output shaft 30*a*1 to mesh with the first Y rack 291**.

The third Y table 253, the third Y motor 303, and the third Y helical gear 283 are substantially the same as the first Y table 251, the first Y motor 301, and the first Y gear 281, respectively.

As shown in FIGS. 4 and 5, the first processing unit 351 is detachably disposed on the table plate **25*b*1. The first ram 35*b*1 moves forward and backward in the Z direction from the first case 35*a*1 along the first axis 2. The first spindle 35*c*1, which extends in the Z direction, is supported by the first ram 35*b*1. The cutting tool 5 is attached to the first spindle 35*c*1. The first ram 35*b*1, the first spindle 31*c*1, and the cutting tool 5 project forward from the bellows cover 17**.

As shown in FIG. 5, the control device 37 synchronously controls the first X motor 241 and the second X motor 242 to move the first column 191 in the X direction while keeping the first column 191 along the Y direction. In addition, the control device 37 synchronously controls the third X motor 243 and the fourth X motor 244 to move the second column 192 in the X direction while keeping the second column 192 along the Y direction. The control device 37 controls the first to fourth Y motors 301 to 304 to move the first to fourth processing units 351 to 354 in the Y direction. The control device 37 controls the first to fourth processing units 351 to 354. Specifically, the control device 37 individually controls the feeding of the first to fourth ram **35*b*1 to 35*b*4 and the rotating of the first to fourth spindle 35*c*1 to 35*c*4. The control device 37** is a numerical control device.

According to the lateral processing machine 10 of the present embodiment, the first to fourth processing units 351 to 354 are moved by the moving columns 191 and 192. The first to fourth spindles **35*c*1 to 35*c*4 are fed by the first to fourth processing units 351 to 354. For example, when the lateral processing machine 10 performs drilling or tapping, the positions of the first to fourth processing units 351 to 354 are kept at the time of machining. If the feeding accuracy of the first to fourth processing units 351 to 354 is ensured, the drilling and tapping are performed with high accuracy. The accuracy of the holes and the taps themselves is guaranteed by the first to fourth processing units 351 to 354**.

The lateral processing machine 10 of the present embodiment is lightweight even when the X stroke and the Y stroke are large. Further, as the Y tables 251 and 252 are arranged on one surface of the first column 191 and the second column 192, it is easy to install a plurality of processing units 351 to 354. In addition, it is easy to adjust the quantity of the column and the processing unit.

In the lateral processing machine 10 of the present embodiment, the upper X guide 211 is disposed on the rear surface of the upper beam 13. The position of the upper beam 13 is positioned by the cutting surface and the installation surface of the X guide rail **21*a*1 in the upper beam 13** is formed by cutting. The parallelism of the upper X guide 211 with the workpiece 3 is thus increased. The lower X guide 212 is also substantially identical to the upper X guide 211.

When the parallelism between the upper X guide 211, the lower X guide 212 and the workpiece 3 increases, the first column 191 and the second column 192 travel in parallel to the reference plane of the workpiece 3. In addition, the positions of the upper X guide 211 and the lower X guide 212 in the front-rear direction are easily aligned. The parallelism between the first column 191 and the vertical plane of the workpiece 3 is thus increased. In addition, the parallelism between the first Y guide 271 and the workpiece 3 is likely to be high. That is, the parallelism between XY plane and the workpiece 3 is likely to be high. The lateral processing machine 10 is thus suitable for milling as well as drilling and tapping.

The upper beam 13 and the lower beam 15 have a vertically elongated cross section. The bending stress in the vertical direction of the upper beam 13 and the lower beam 15 is thus reduced, and the front-rear width of the upper beam 13 and the lower beam 15 can be reduced.

Further, the first connection block 19*d*1 is disposed on the rear surface of the upper X guide 211. The second connection block 19*d*2 is disposed on the rear surface of the lower X guide 212. The first column portion 19*e*1, which extends frontward (−Z) direction, is disposed below the upper beam 13 and the first connection block 19*d*1, and above the lower beam 15 and the second connection block 19*d*2. This increases the distance between the set of first Y guides 271. This also increases the rigidity with respect to the processing reaction force in the thrust direction that is received when the first processing unit 351 performs processing. Thus, the front and rear widths of the upper beam 13, the lower beam 15, and the first column 191 can be reduced. The second column 192 and the second Y guide 272 are also substantially the same as the first column 191 and the first Y guide 271. This reduces the depth of the lateral processing machine 10 in the front-rear direction.

The extension of the first ram 35*b*1 of the first processing unit 351 is limited. When the first ram 35*b*1 is extended, the first ram 35*b*1 protrudes forward from the upper beam 13, the lower beam 15, and the first column 19. This defines the processable range of the first processing unit 351 in the Z direction. As the front-rear width of the upper beam 13, the lower beam 15, and the first column 191 can be reduced, the depth of the first Y table 251 can be reduced even when the front-rear length of the first processing unit 351 is short. The weight of the first Y table 251, the first processing unit 351, and the first Y motor 301 can thus be reduced. The second to fourth Y tables 252 to 254, the second to fourth processing units 352 to 354, and the second to fourth Y motors 302 to 304 are also substantially the same as the first Y table 251, the first processing unit 351, and the first Y motor 301, respectively.

The first column portion 19*e*1 includes a first main column 19*a*1, a first sub-column 19*b*1, and a first side-column 19*c*1. As the part where the processing reaction force is not applied is hollowed out, the weight of the first column portion 19*e*1 is reduced.

With the above-described structure, the inertia moment of the first processing machine group 181 is reduced. The size of the first X motor 241, the second X motor 242, the first Y motor 301, and the second Y motor 302 can thus be reduced. Further, the lateral processing machine 10 can be lightweight even when the X stroke length and the Y stroke length are increased.

In the present embodiment, the first processing unit 351 and the third processing unit 353 are disposed on the left side of the first column 191. The second column 192 is disposed on the left side of the first column 191. The second processing unit 352 and the fourth processing unit 354 are disposed on the right side of the second column 192. Thus, the first column 191 and the second column 192 are not disposed between the first and the third processing units 351, 353 and the second and the fourth processing units 352, 354. Thus, the first and the third processing units 351, 353 and the second and the fourth processing units 352, 354 can be brought close to each other. When the first to fourth processing units 351 to 354 simultaneously process the workpiece 3, the degree of freedom in processing order and processing time allocation is increased.

The lateral processing machine 10 of the present embodiment is moved in the X direction by a rack and pinion mechanism. The first column 191 and the second column 192 can thus move in the X direction across the full stroke.

In general, in a rack and pinion mechanism, a magnitude of a force applied to the pinion in a traveling direction and a backlash amount change periodically according to a position. Thus, it is difficult to adopt it to the feed shaft of the machine tool. In particular, it is not suitable to synchronously feed both ends of an elongated object by servo control.

In contrast, in the present embodiment, the upper X rack 231 and the lower X rack 232 are helical racks. The first X gear 221 and the second X gear 222 are helical gears. One or more teeth are thus engaged between the upper X rack 231 and the first X gear 221. Further, one or more teeth are engaged between the lower X rack 232 and the second X gear 222. This suppresses vibrations of the first X gear 221 and the second X gear 222. Even when the upper end and the lower end of the first column 191 are synchronously fed by servo driving, the first column 191 is smoothly controlled. This improves machining accuracy.

The vibration suppressing effect of the second column 192 is also substantially the same as that of the first column 191.

The lateral processing machine 10 of the present embodiment is moved in the Y direction by a rack and pinion mechanism. The first processing unit 351 and the third processing unit 353 can thus move in the Y direction across the full stroke. The second processing unit 352 and the fourth processing unit 354 are also substantially identical to the first processing unit 351 and the third processing unit 353.

The first Y rack 291 is a helical rack. The first Y gear 281 is a helical gear. Thus, one or more teeth engage between the first Y rack 291 and the first Y gear 281. This suppresses the vibration of the first Y gear 281. The first Y table 251 is thus smoothly controlled.

The 2nd to fourth Y tables 252 to 254 are substantially the same as the first Y table 251.

The support frame 11 has an opening 11*g*. For example, as shown in FIG. 2, when the first processing machine group 181 is moved in the X direction so as to overlap with the opening 11*g*, the operator can perform maintenance of the first processing machine group 181 through the opening 11*g*. Specifically, the operator can attach, detach and adjust the first processing unit 351, the third processing unit 353, the first Y table 251, the third Y table 253, the first Y guide 271, and the first Y rack 291. The second processing machine group 182 is substantially the same as the first processing machine group 181.

The first ram **35*b*1 and the third ram 35*b*3 move in the X direction while being aligned in the Y direction. This suppresses the inclination of the first X box 17*b*1. The second X box 17*b*2 is substantially the same as the first X box 17*b*1**.

Second Embodiment

Figure 7:
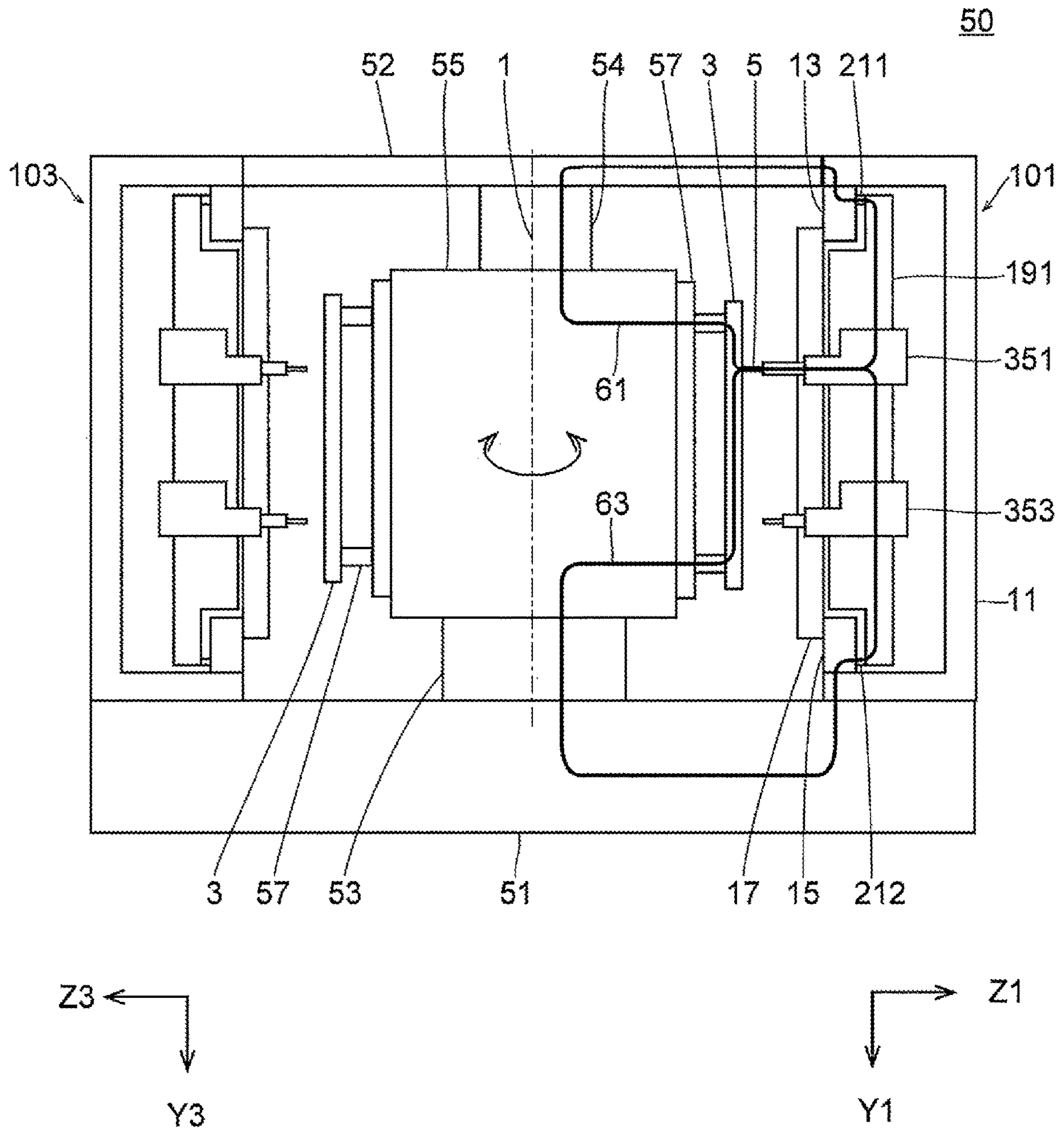
FIG. 7 is a front view of a lateral processing machine according to a second embodiment.
Figure 8:
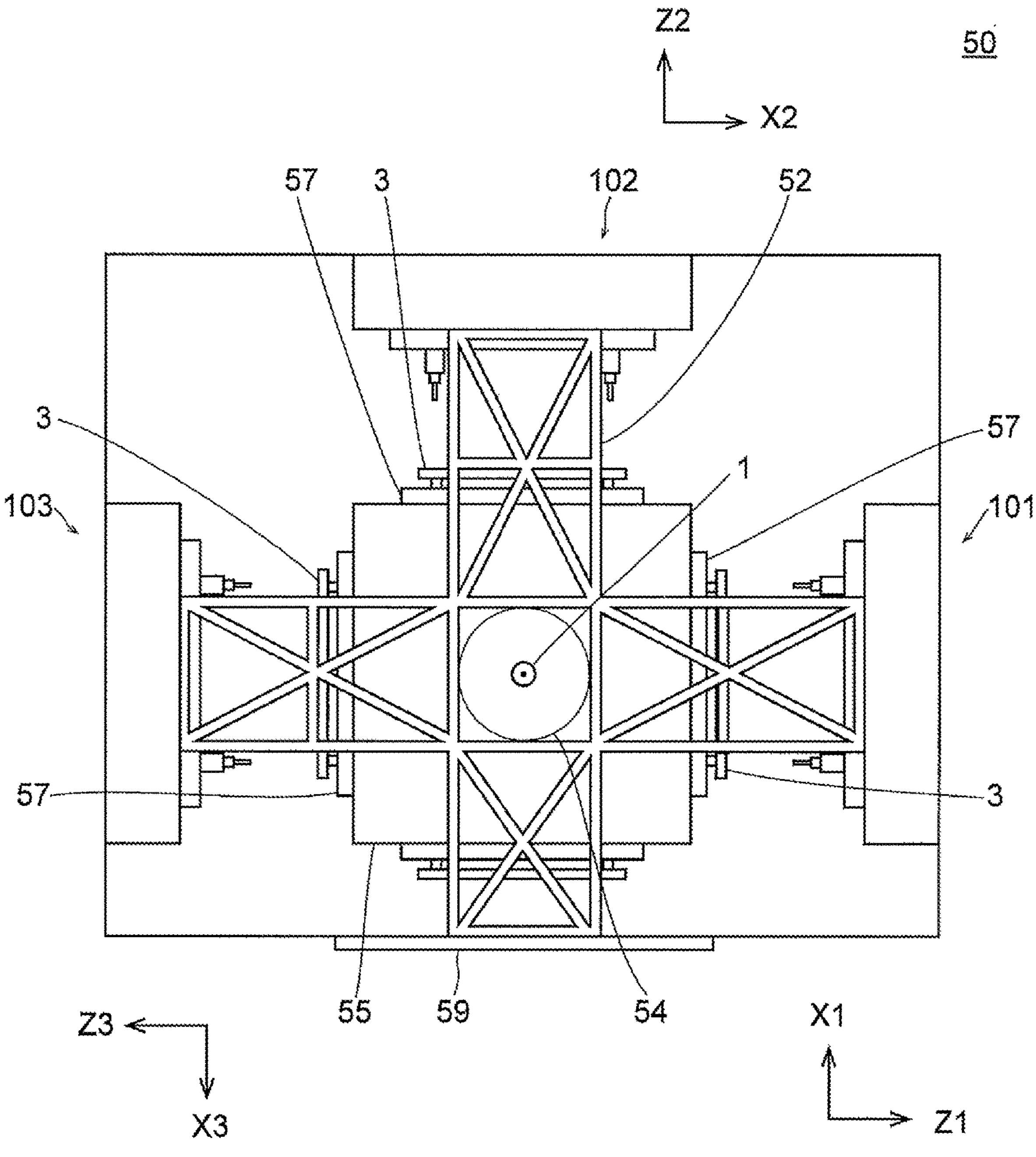
FIG. 8 is a plan view of the lateral processing machine according to the second embodiment.

Next, a lateral processing system 50 of a second embodiment will be described. As shown in FIGS. 7 and 8, the lateral processing system 50 of the present embodiment includes a plurality of (three in the present embodiment) lateral processing machines 101 to 103, a bed 51, a turntable 53, an equerre 55, a support shaft 54, an upper coupling frame 52, a plurality of pallets 57, and a loading door 59.

The bed 51 supports the lateral processing machines 101 to 103. The bed 51 collects and discharges chips and machining coolant generated by machining.

The loading door 59 is arranged on the front of the lateral processing system 50 (downward in FIG. 8). The workpiece 3 is carried in from the loading door 59 by a robot or an operator to be attached to the pallet 57.

As shown in FIG. 8, the three lateral processing machines 101 to 103 are arranged around the rotation axis 1 at a center angle of 90 degrees. Each of the lateral processing machines 101 to 103 of the present embodiment is substantially the same as the lateral processing machine 10 of the first embodiment. The support frames 11 of the lateral processing machines 101 to 103 each has a lower end coupled to the bed 51.

The lateral processing machine 101 moves in three directions; an X1 axis, a Y1 axis, and a Z1 axis. The lateral processing machine 102 moves in three directions; an X2 axis, a Y2 axis (not shown), and a Z2 axis. The lateral processing machine 103 moves in three directions; an X3 axis, a Y3 axis, and a Z3 axis.

As shown in FIG. 7, the upper coupling frame 52 connects the upper ends of the support frames 11 of the plurality of lateral processing machines 101 to 103. The support shaft 54 is disposed on the upper coupling frame 52 around the rotation axis 1.

The turntable 53 is disposed on the bed 51 around the rotation axis 1.

As shown in FIGS. 7 and 8, the equerre 55 has a rectangular parallelepiped shape. The lower end of the equerre 55 is connected to the turntable 53. An upper end of the equerre 55 is supported by the support shaft 54. Both ends of the equerre 55 are rotatably supported by the turntable 53 and the support shaft 54. The plurality of pallets 57 are respectively fixed to the side surfaces of the equerre 55.

The turntable 53 rotates the equerre 55 about the rotation axis 1 by 90 degrees to position the pallet 57 in the direction of the lateral processing machines 101 to 103. Each of the lateral processing machines 101 to 103 processes the workpiece 3 installed on the corresponding pallet 57. The lateral processing machines 101 to 103 simultaneously process a plurality of workpieces 3. Each of the lateral processing machines 101 to 103 processes a different part of the workpiece 3, respectively. By rotating the turntable 53 four times after processing by the lateral processing machines 101 to 103, a large number of targets positions can be processed quickly at the same time.

As shown in FIG. 7, according to the lateral processing system 50 of the present embodiment, the upper coupling frame 52 and the equerre 55 are connected via the support shaft 54 at the upper end of the support frame 11. The bed 51, the turntable 53, and the equerre 55 are connected at the lower end of the support frame 11.

For example, when the workpiece 3 is processed by the first processing unit 351, the processing reaction force acts on the mechanical closed loop 61 composed of the first processing unit 351, the first column 191, the upper beam 13, the upper coupling frame 52, the support shaft 54, the equerre 55, the pallet 57, and the workpiece 3. At the same time, the processing reaction force acts on the mechanical closed loop 63 composed of the first processing unit 351, the first column 191, the lower beam 15, the bed 51, the turntable 53, the equerre 55, the pallet 57, and the workpiece 3. As the processing reaction force simultaneously acts on the upper closed loop 61 and the lower closed loop 63, the loop rigidity is increased. Further, as the processing reaction force simultaneously acts on the upper closed loop 61 and the lower closed loop 63, the parallelism and squareness of XY axis and the workpiece 3 of the lateral processing machine 101 are easily maintained.

Third Embodiment

Figure 9:
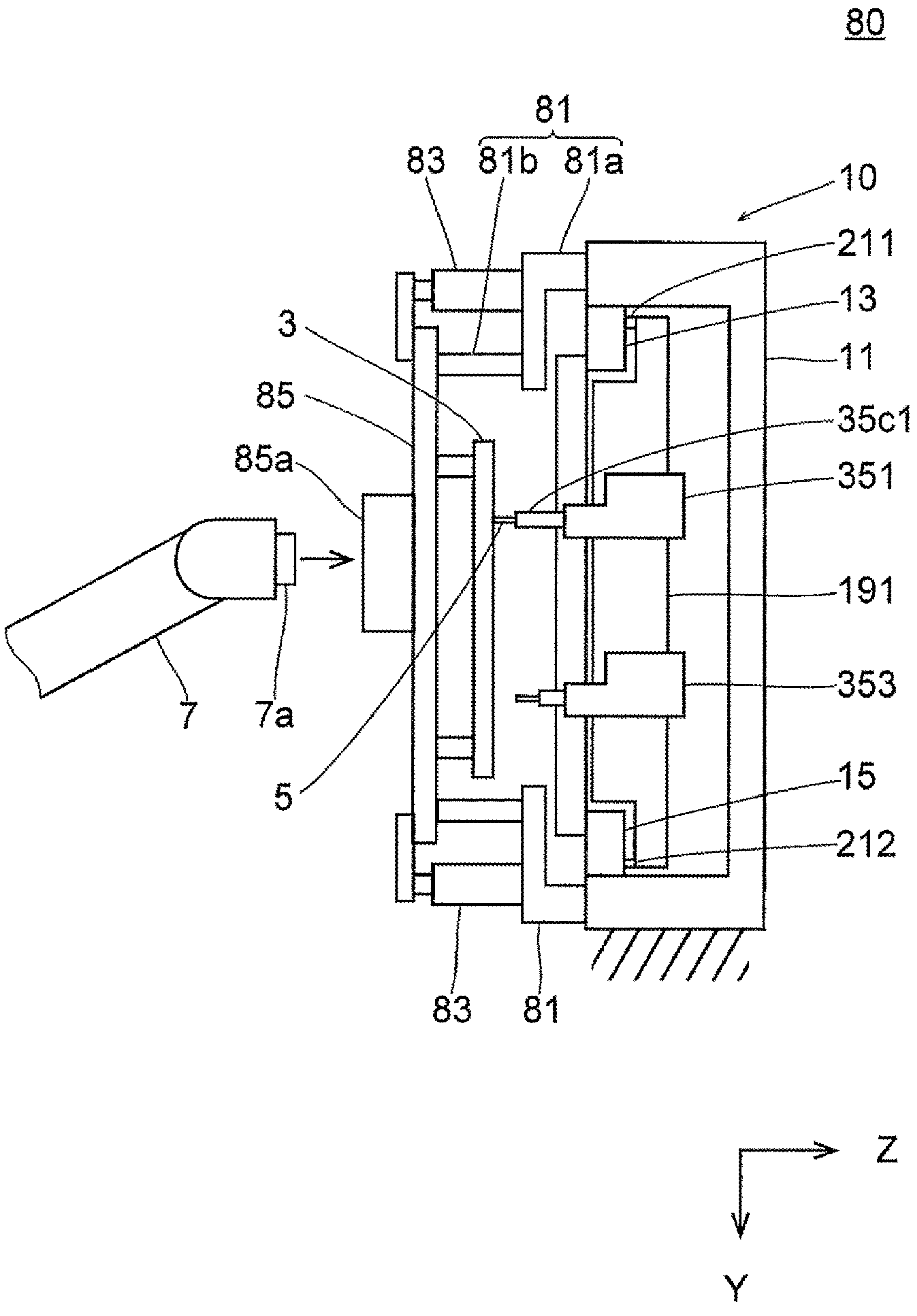
FIG. 9 is a lateral processing machine according to a third embodiment.

Next, a lateral processing system 80 of a third embodiment will be described. As shown in FIG. 9, the lateral processing system 80 of the present embodiment includes a lateral processing machine 10, a pallet support 81, a pallet clamp 83, and a pallet 85.

The lateral processing system 80 may include a robot 7. The robots 7 includes a connecting portion **7*a*. The robot 7 is, for example, a vertical articulated robot. The robot 7 carries the pallet 85 with the workpiece 3 into or out of the lateral processing system 80**.

The pallet support 81 includes a bracket **81*a* and a stem 81*b*. The bracket 81*a* has, for example, an L-shape. The bracket 81*a* is fixed to the support frame 11. For example, the pallet support 81 is disposed at four corners of the front surface of the support frame 11. The stem 81*b* extends from the brackets 81*a* in Z direction toward the distal end of the first spindle 35*cl***.

The pallet clamp 83 is fixed to the bracket **81*a*. The pallet clamp 83 urges the pallet 85 toward the support frame 11**.

The pallet 85 includes a connecting portion **85*a*. The pallet 85 holds the workpiece 3 on one surface of the pallet 85 (a surface facing the lateral processing machine 10). The connecting portion 85*a* is disposed on the other surface of the pallet 85. The connecting portion 85*a* is detachably connected to the connecting portion 7*a*. The pallet 85 is held between the stem 81*b* and the pallet clamp 83 to be fixed to the support frame 11**.

As the lateral processing system 80 of the present embodiment makes the mechanical closed loop to be small, the loop rigidity can be increased. As shown in FIG. 9, for example, when the first processing unit 351 processes the workpiece 3, the processing reaction force acts on an upper mechanical closed loop (not shown) composed of the first processing unit 351, the first column 191, the upper beam 13, the pallet support 81, the pallet clamp 83, the pallet 85, and the workpiece 3. In addition, the processing reaction force acts on a lower mechanical closed loop (not shown) through the lower beam 15.

The robot 7 can attach the workpiece 3 directly to the support frame 11 together with the pallet 85. Thus, in the case where a plurality of lateral processing machines 10 are installed, the lateral processing machines 10 can be freely laid out. For example, the plurality of lateral processing machines 10 may be aligned in a straight line along the X direction. In this case, the robot 7 may be a traveling robot that travels in the X direction. In addition, two rows of lateral processing machines 10 may be symmetrically arranged with respect to the travel path of the robot 7.

REFERENCE SIGNS LIST

10 Lateral processing machine
13 Upper beam
15 Lower beam
211 Upper X guide
212 Lower X guide
191 First column (First moving column)
271 First Y Guide
251 First Y table
252 Second Y table
351 First processing unit
**35*b*1** First ram
**25*c*1** First spindle
352 Second processing unit
**35*b*2** Second ram
**35*c*2** Second spindle
50, 80 Lateral processing system

What is claimed is:

1. A lateral processing machine (10), comprising:
an upper beam (13) and a lower beam (15) extending in an X direction;
an upper X guide (211) disposed on a rear surface of the upper beam (13), the upper X guide (211) extending in the X direction;
a lower X guide (212) disposed on a rear surface of the lower beam (15), the lower X guide (212) extending in the X direction;
a first moving column (191) extending in a Y direction orthogonal to the X direction, the first moving column (191) including,
a first connection block (**19*d*1) disposed on the upper X guide (211), the first connection block (19*d*1**) configured to move in the X direction,
a second connection block (**19*d*2) disposed on the lower X guide (212), the second connection block (19*d*2**) configured to move in the X direction, and
a first column portion (**19*e*1) connecting the first connection block (19*d*1) and the second connection block (19*d*2**);
a pair of first Y guides (271) disposed on the first moving column (191), each of the first Y guide (271) extending in the Y direction;
a first Y table (251) disposed on the pair of the first Y guides (271), the first Y table (251) configured to move in the Y direction; and
a first processing unit (351) detachably attached to the first Y table (251), the first processing unit (351) including,
a first ram (**35*b*1**) configured to move in a Z direction orthogonal to both the X direction and the Y direction, and
a first spindle (**35*cl*) supported by the first ram (35*b*1**),
wherein
the first column portion (**19*e*1**) has a cross-section extending in the Z direction, and
the pair of the first Y guides (271) are arranged in the Z direction,
the first column portion (**19*e*1) is disposed entirely below the upper beam (13) and the first connection block (19*d*1), and disposed entirely above the lower beam (15) and the second connection block (19*d*2**), and
a width of the first column portion (**19*e*1) in the Z direction is substantially the same as a width of the upper beam (13), the first connection block (19*d*1), the lower beam (15) and the second connecting block (19*d*2**) in the Z direction.

2. The lateral processing machine (10) according to claim 1, further comprising:
a fourth Y table (254) disposed on the pair of the second Y guides (272), the fourth Y table (254) configured to move in the Y direction; and
a fourth processing unit (354) detachably attached to the fourth Y table (254), the fourth processing unit (354) including,
a fourth ram (**35*b*4**) configured to move in the Z direction, and
a fourth spindle (**35*c*4) supported by the fourth ram (35*b*4**).

3. The lateral processing machine (10) according to claim 1, further comprising:
a support frame (11) supporting the upper beam (13) and the lower beam (15), the support frame (11) having a truss structure, the support frame (11) having an opening (**11*g*) extending in the vertical direction for the first processing unit (351**) to be exposed.

4. The lateral processing machine (10) according to claim 1, further comprising:
an upper X helical rack (231) disposed on the upper beam (13), the upper X helical rack (231) extending in the X direction;
a first X motor (241) including a first X output shaft (**24*a*1), the first X motor (241) disposed on the first connection block (19*d*1**);
a first X helical gear (221) fastened to the first X output shaft (**24*a*1) to mesh with the upper X helical rack (231**);
a lower X helical rack (232) disposed on the lower beam (15), the lower X helical rack (232) extending in the X direction;
a second X motor (242) including a second X output shaft (**24*a*2), the second X motor (242) disposed on the second connection block (19*d*2**);
a second X helical gear (222) fastened to the second X output shaft (**24*a*2) to mesh with the lower X helical rack (232**); and
a control device (37) configured to synchronize a rotation of the first X output shaft (**24*a*1) with a rotation of the second X output shaft (24*a*2**).

5. The lateral processing machine (10) according to claim 1, further comprising:
a first Y helical rack (291) disposed on the first moving column (191), the first Y helical rack (291) extending in the Y direction;
a first Y motor (301) including a first Y output shaft (**30*a*1), the first Y motor (301) disposed on the first Y table (251**);
a first Y helical gear (281) fastened to the first Y output shaft (**30*a*1) to mesh with the first Y helical rack (291**);
a second Y motor (302) including a second Y output shaft (**30*a*2), the second Y motor (302) disposed on the second Y table (252**); and
a second Y helical gear (282) fastened to the first Y output shaft (**30*a*1) to mesh with the first Y helical rack (291**).

6. A lateral processing system (50), comprising:
the lateral processing machine (10) according to claim 1; and
an equerre (55) to which a workpiece (3) is attached, the equerre (55) including, an upper portion connected to the upper beam (13), and a lower portion connected to the lower beam (15).

7. The lateral processing machine (10) according to claim 1, wherein the first column portion (**19*e*1) includes a first main column (19*a*1), a first sub-column (19*b*1) disposed on the second side of the first main column (19*a*1), and a first side-column (19*c*1) connected to the first main column (19*a*1) and disposed on a lateral side of the first main column (19*a*1) in the Z direction, the first connection block (19*d*1) connects upper ends of the first main column (19*a*1) and the first sub-column (19*b*1), the second connection block (19*d*2) connects lower ends of the first main column (19*a*1) and the first sub-column (19*b*1), and the pair of first Y guides (271) are disposed on the first main column (19*a*1) and the first side-column (19*c*1**), respectively.

8. The lateral processing machine (10) according to claim 1, further comprising:

a second moving column (192) extending in the Y direction, the second moving column (192) disposed on a first side from the first moving column (191) in the X direction, the second moving column (192) including, a third connection block (**19*d*3) disposed on the upper X guide (211), the third connection block (19*d*3) configured to move in the X direction, a fourth connection block (19*d*4) disposed on the lower X guide (212), the fourth connection block (19*d*4) configured to move in the X direction, and a second column portion (19*e*2) connecting the third connection block (19*d*3) and the fourth connection block (19*d*4**);

a pair of second Y guides (272) disposed on a second side of the second moving column (192), the second side being opposite to the first side, each of the second Y guide (272) extending in the Y direction;

a second Y table (252) disposed on the pair of the second Y guides (272), the second Y table (252) configured to move in the Y direction; and a second processing unit (352) detachably attached to the second side of the second Y table (252), the second processing unit (352) including, a second ram (**35*b*2) configured to move in the Z direction, and a second spindle (35*c*2) supported by the second ram (35*b*2**);

wherein the first processing unit (351) is disposed on the first side of the first moving column (191), the second column portion (**19*e*2) is disposed below the upper beam (13) and the third connection block (19*d*3), and disposed above the lower beam (15) and the fourth connection block (19*d*4), and a width of the second column portion (19*e*2) in the Z direction is substantially the same as a width of the upper beam (13), the third connection block (19*d*3), the lower beam (15) and the fourth connecting block (19*d*4**) in the Z direction.

9. The lateral processing machine (10) according to claim 8, further comprising:

a third Y table (253) disposed on the pair of the first Y guides (271), the third Y table (253) configured to move in the Y direction; and a third processing unit (353) detachably attached to the third Y table (253), the third processing unit (353) including, a third ram (**35*b*3) configured to move in the Z direction, and a third spindle (35*c*3) supported by the third ram (35*b*3**).

10. The lateral processing machine (10) according to claim 8, further comprising:

a fourth Y table (254) disposed on the pair of the second Y guides (272), the fourth Y table (254) configured to move in the Y direction; and a fourth processing unit (354) detachably attached to the fourth Y table (254), the fourth processing unit (354) including, a fourth ram (**35*b*4) configured to move in the Z direction, and a fourth spindle (35*c*4) supported by the fourth ram (35*b*4**).

11. The lateral processing machine (10) according to claim 8, wherein the second column portion (**19*e*2) includes a second main column (19*a*2), a second sub-column (19*b*2) disposed on the first side of the second main column (19*a*2), and a second side-column (19*c*2) connected to the second main column (19*a*2) and disposed on a lateral side of the second main column (19*a*2) in the Z direction, the third connection block (19*d*3) connects upper ends of the second main column (19*a*2) and the second sub-column (19*b*2), the fourth connection block (19*d*4) connects lower ends of the second main column (19*a*2) and the second sub-column (19*c*2), and the pair of the second Y guides (272) are disposed on the second main column (19*a*2) and the second side-column (19*c*2**), respectively.

12. The lateral processing machine (10) according to claim 1, further comprising:

a third Y table (253) disposed on the pair of the first Y guides (271), the third Y table (253) configured to move in the Y direction; and a third processing unit (353) detachably attached to the third Y table (253), the third processing unit (353) including, a third ram (**35*b*3) configured to move in the Z direction, and a third spindle (35*c*3) supported by the third ram (35*b*3**).

13. The lateral processing machine (10) according to claim 12, further comprising:

a fourth Y table (254) disposed on the pair of the second Y guides (272), the fourth Y table (254) configured to move in the Y direction; and a fourth processing unit (354) detachably attached to the fourth Y table (254), the fourth processing unit (354) including, a fourth ram (**35*b*4) configured to move in the Z direction, and a fourth spindle (35*c*4) supported by the fourth ram (35*b*4**).

14. The lateral processing machine (10) according to claim 12, further comprising:

a expansion cover case (**17*a*) disposed on the upper beam (13) and the lower beam (15), the expansion cover case (17*a***) extending both in the X direction and in the Y direction;

a first X box (**17*b*1) extending in the Y direction, the first X box (17*b*1) receiving the first ram (35*b*1) and the third ram (35*b*3) to pass through, the first X box (17*b*1) configured to move in the X direction inside the expansion cover case (17*a***);

a first Y box (**17*c*1) receiving the first ram (35*b*1) to pass through, the first Y box (17*c*1) configured to move in the Y direction inside the first X box (17*b*1**);

a plurality of first X expansion covers (**17*f*) disposed between the expansion cover case (17*a*) and the first X box (17*b*1), the plurality of the first X expansion covers (17*f*) configured to expand and contract in the X direction; and a plurality of first Y expansion covers (17*g*) disposed between an end of the first X box (17*b*1) and the first Y box (17*c*1), the plurality of the first Y expansion covers (17*g***) configured to expand and contract in the Y direction.

15. The lateral processing machine (10) according to claim 14, further comprising:

a second X box (**17*b*2) extending in the Y direction, the second X box (17*b*2) receiving the second ram (35*b*2) and the fourth ram (35*b*4) to pass through, the second X box (17*b*2) configured to move in the X direction inside the expansion cover case (17*a***);

a second Y box (**17*c*2) receiving the second ram (35*b*2) to pass through, the second Y box (17*c*2) configured to move in the Y direction inside the second X box (17*b*2); and a plurality of second Y expansion covers (17*g*) disposed inside the second X box (17*b*2) between an end of the second X box (17*b*2) and the fourth Y box (17*c*4), the plurality of the second Y expansion covers (17*g***) configured to expand and contract in the Y direction;

wherein the plurality of the first X expansion covers (**17*f*) are partially disposed between the expansion cover case (17*a*) and the second X box (17*b*2), and the plurality of the first X expansion covers (17*f*) are partially disposed between the first X box (17*b*1) and the second X box (17*b*2**).

16. The lateral processing machine (10) according to claim 14, further comprising:

a third Y box (**17*c*3) receiving the third ram (35*b*3) to pass through, the third Y box (17*c*3) configured to move in the Y direction inside the first X box (17*b*1**);

wherein the plurality of the first Y expansion covers (**17*g*) are partially disposed between the first Y box (17*c*1) and the third Y box (17*c*3), and the plurality of the first Y expansion covers (17*g*) are partially disposed between an end of the first X box (17*b*1) and the third Y box (17*c*3**).

17. The lateral processing machine (10) according to claim 14, further comprising:

a fourth Y box (**17*c*4) receiving the fourth ram (35*b*4) to pass through, the fourth Y box (17*c*4) configured to move in the Y direction inside the second X box (17*b*2**);

wherein the plurality of the second Y expansion covers (**17*g*) are partially disposed between the second Y box (17*c*2) and the fourth Y box (17*c*4), and the plurality of the second Y expansion covers (17*g*) are partially disposed between an end of the second X box (17*b*2) and the fourth Y box (17*c*4**).

18. A lateral processing system (80), comprising:

the lateral processing machine (10) according to claim 8;

a pallet (85) to which a workpiece (3) is attached; and a pallet clamp (83) connected to the upper beam (13) and the lower beam (15);

wherein the pallet clamp (83) fixes the pallet (85) while the first processing unit (351) or the second processing unit (352) processes the workpiece (3).

* * * * *